Feb. 4, 1964 W. W. CUSHMAN Re. 25,519

SUCTION LIFT MEANS FOR INDUSTRIAL LIFT TRUCKS

Original Filed Oct. 31, 1957

INVENTOR.
WALTON W. CUSHMAN

BY
BUCKHORN, BLORE, KLARQUIST & SPARKMAN
ATTORNEYS

United States Patent Office

Re. 25,519
Reissued Feb. 4, 1964

25,519

SUCTION LIFT MEANS FOR INDUSTRIAL LIFT TRUCKS

Walton W. Cushman, Prince Georges County, Md.
(6428 Lumar Drive SE., Washington 22, D.C.)

Original No. 2,893,581, dated July 7, 1959, Ser. No. 693,790, Oct. 31, 1957. Application for reissue Apr. 26, 1960, Ser. No. 24,861
9 Claims. (Cl. 214—651)
(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein, if patented, may be manufactured and used by or for the *United States* Government for governmental purposes, without the payment to me of any royalty thereon.

My invention relates to suction lift means for industrial lift trucks adapted particularly, although not exclusively, for handling partially vacuumized unitized packages such, for example, as those covered by my U.S. Letters Patent No. 2,709,519 patented May 31, 1955.

Previously known means for handling this general type of package comprised a conventional fork lift truck whose forks carried a vacuum bell which was moved into contact with the top surface of a package to be lifted and transported. Such equipment was restricted in its use to packages of given cubic contents and height due to the fact that the vacuum bell was supported by and carried beneath the conventional fork or forks of the truck which normally are just above floor level.

One of the important objects of the present invention is to provide lift means as aforesaid which is capable of lifting and transporting packages of extremely large size and of great height and weight.

Another object is to provide auxiliary means for creating a vacuum for use in emergencies due to failure of the engine of the industrial lift truck; a further object is to provide means having a greater contact area with the package to be lifted and transported whereby substantially the entire surface area of the top of the package is subjected to vacuum or suction; and a still further object is to provide for the lifting of cargo, etc., without the attending wastage of space heretofore occupied by the conventional pallet, or other device, normally used to "get under" the load.

*Another object of the invention is to provide a lift truck having a suction mechanism for engaging a load wherein the suction is provided by the intake manifold of an internal combustion engine on the lift truck, and a further object of the invention is to provide an arrangement as just described in which there is an auxiliary vacuum pump on the truck, there being valve means for controlling the communication between the various parts.*

*Another object of the invention is to provide a novel method of and apparatus for lifting a load with the aid of vacuum, and particularly a load comprising a plurality of items.*

The foregoing and other objects and advantages of the present invention will appear from the following description and appended claims.

In the accompanying drawing, forming a part of this application, and in which like reference numerals are employed to designate similar parts in the several views.

Figure 1:
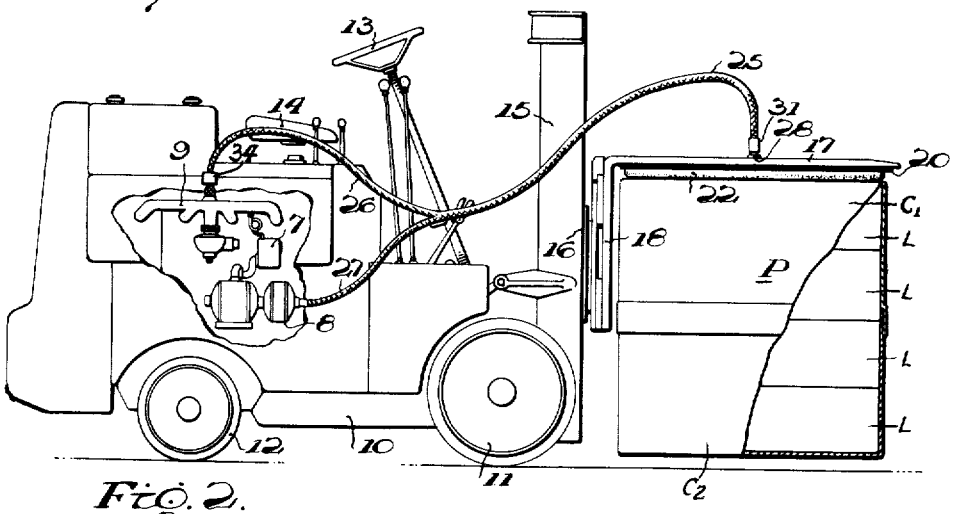
FIGURE 1 is a side elevational view, partly broken away, of a conventional fork lift truck, showing the application thereto of one embodiment of the present invention.

Referring now particularly to the drawing, there is shown in FIG. 1 a more or less conventional industrial lift truck of either the fork or platform type with one embodiment of the present invention applied thereto. The numeral 10 designates the truck as a whole which has a pair of front wheels 11 and a pair of rear wheels 12, the latter being mounted on a pair of stub axles (not shown) and operated for steering purposes by a steering wheel 13 located adjacent the operator's seat 14. Trucks of this type are usually provided with an upright frame or mast 15 upon which a load-supporting carriage 16 is slidably mounted.

These industrial trucks are in nearly universal use in conjunction with pallets or skids for transporting and storing goods at freight depots, warehouses, etc., and are generally provided with a pair of plain fork members adapted to enter the space between the upper and lower surfaces of the pallets.

In accordance with my invention, instead of providing a pair of conventionally mounted fork members, I employ horizontally and forwardly extending spaced members or arms 17, 17 which have depending portions or members 18, 18 at their inner ends, which latter are attached to portions of the supporting carriage 16 to be raised and/or lowered with said carriage.

Figure 2:
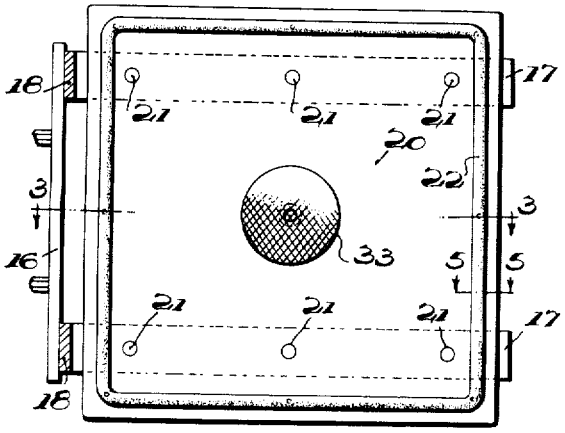
FIGURE 2 is a somewhat enlarged scale bottom plan view, partly in section, of the package-engaging or contacting means of the invention.
Figure 5:
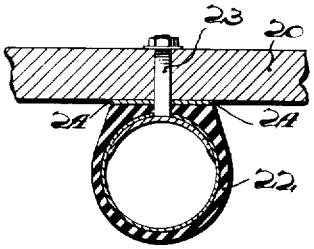
FIGURE 5 is a enlarged scale detail view, being a section along the line 5—5 of FIGURE 2, looking in the direction of the arrows.
Figure 3:
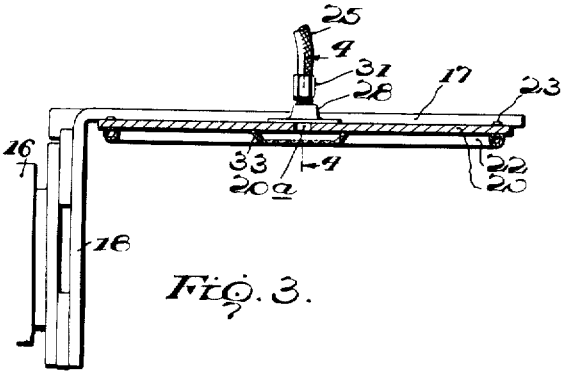
FIGURE 3 is a vertical longitudinal section, taken substantially along the line 3—3 of FIGURE 2, looking in the direction of the arrows.

As shown, a preferably square steel plate 20 is attached at spaced points 21, to the under face of the horizontal spaced members 17, 17. The under face or surface of plate 20 carries a rubber hose, shown as a whole at 22, and attached to said plate in any desired manner, as by means of spaced bolt and nuts assemblies 23, see particularly FIG. 5. The hose is also bonded to plate 20 throughout its entire length, as indicated at 24 in FIG. 5, and preferably follows the outline or configuration of plate 20, see FIG. 2.

The space or area beneath plate 20, which is surrounded or framed by hose 22, is capable of having air exhausted therefrom to create a vacuum at that location. For this purpose, there is a connecting hose or conduit 25 which is forked adjacent its rear or inner end to provide branches 26 and 27. Branch 26 extends to and is connected with the intake manifold 9 of the truck engine. Branch 27 extends to and is connected with an electrically powered vacuum pump assembly 8. This pump assembly is of a conventional type and is provided for emergency use in the event of failure of the truck engine. It is arranged to be actuated by a conventional pressure switch 7 which may be set to cut in at approximately 14" Hg.

Plate 20 has a centrally disposed hole or passage 20a and has affixed to the top face thereof, in airtight manner, a casting 28 having an air port or passage 29 in communication with hole 20a and hose or conduit 25. Casting 28 has an externally threaded upper reduced end portion or boss 30. An internally threaded coupling nut or collar 31 serves to attach the adjacent end of hose or conduit 25 to boss 30 of the casting, in conventional manner, to provide an airtight joint or connection.

The lift means of the present invention is adapted particularly, although not exclusively, for use in the handling of packages such as package P, FIG. 1, similar to my aforesaid Letters Patent No. 2,709,519. *The package therefore comprises a lower flexible member in the form*

*of a cover section C1 and an upper flexible member in the form of a top cover section C2, the lower margin of the top cover section overlapping the upper margin of the lower cover section. The cover sections are merely in frictional contact with one another and are not otherwise secured to one another. When the package P is partially evacuated to create a subatmospheric pressure within the package P, a unitized package is created despite the fact that the package comprises or encloses a plurality of stacked separately packaged load items L, four being shown in FIG. 1 and in my Patent No. 2,709,519.* Packages in accordance with this patent have square or rectangular ends, each of which presents an area which is only slightly greater than the area defined by seal or hose 22 and steel plate 20. Thus, when the hose 22 and steel plate 20 are placed upon the top end of package P, see FIG. 1, and the air is exhausted in the area defined by hose 22, either as the result of the conduit 25, 26 connection with the intake manifold 9, or the conduit connection 25, 27 with the vacuum pump 8, a vacuum is created over virtually the entire top surface area of package P. As the result, the package P is actually lifted from the bottom by atmospheric pressure as the lifting means is actuated. *It is apparent therefore that a plurality of packaged items are lifted by applying the suction head to the top cover section only and without the cover sections being secured together. Thus, the present invention teaches the steps of lifting a plurality of packages or packaged items by enclosing the packages in a flexible airtight cover which may comprise a lower part and an upper part, evacuating air from within the cover to create a subatmospheric pressure within the cover to unitize the load, then creating a zone of subatmospheric pressure on a selected area of the exterior of the cover and moving zone of subatmospheric pressure thereby to move the unitized load because of the atmospheric pressure on the opposite side of the load acting against the load.*

By reason of the arrangement and relatively high position of the fork-like members or arms 17 and the steel plate 20, it is possible to engage and handle packages, such as package P, which are of relatively great height. This would not be possible, however, if the arms were located so as to project forwardly from the lower ends of portions [or] *of* members 18.

Figure 4:
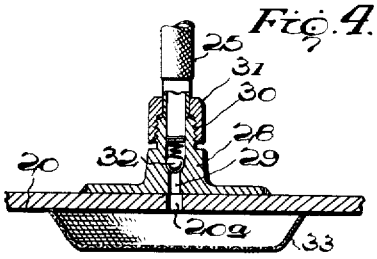
FIGURE 4 is an enlarged scale detail in transverse vertical section, taken substantially along the line 4—4 of FIGURE 3 looking in the direction of the arrows.

It is to be understood that suitable means *may be* [is] provided so that, in the event of engine failure, thus terminating the suction supply, or vacuum, from intake manifold 9, the immediate seating of the spring-pressed ball valve 32 in boss 30, see FIG. 4, prevents the loss of vacuum in the space or area surrounded by seal 22 between plate 20 and the top of package P, due to any feed-back of air or gases from the engine intake manifold. Simultaneously, any loss in vacuum in line 25 to a suction below approximately 14″ Hg causes the closing of the pressure switch (not shown) thus starting the auxiliary electric vacuum pump 8 to maintain the necessary vacuum in said space or area.

A check valve [(not shown) but] *34 which is* similar to the valve 32, FIG. 4, is located in line 26 to prevent its losing vacuum through the engine intake manifold system.

To assure an uninterrupted suction supply to the space or area surrounded by the seal 22 and between plate 20 and the top of package P, a guard or protector, in the form of a wire screen 33 is attached to the under face of plate 20 surrounding the aligned hole 20a and passage 29 (FIG. 4).

*To release a load, the suction may be interrupted in any desired manner. The engine could be stopped and the value 32 opened to allow air from the air intake to the carburetor to break the vacuum. Obviously under these circumstances, the pump 8 would not need to be operated, and its operation could be terminated in any desired manner. If it is inconvenient to stop the engine, any suitable arrangement could be provided for breaking the vacuum.*

Obviously, the invention is not limited to the embodiments herein shown and described, but may assume other forms.

I claim:

1. Package engaging and lifting means for mounting upon an industrial truck in which the truck includes an internal combustion engine, an upright frame and a load-supporting carriage slidably mounted on said upright frame, said means comprising arms projecting forwardly from said carriage and having depending portions affixed to said carriage to move therewith, a generally square steel plate carried by and depending from said arms a flexible continuous sealing member bonded to the underside of said plate following the generally square outline of the plate and disposed adjacent the four edges thereof whereby to provide a suction area of substantial size between said plate and the package, and a flexible conduit interconnecting the steel plate and the intake manifold of the internal combustion engine.

2. Package engaging and lifting means for mounting upon an industrial truck in which the truck includes an internal combustion engine, an upright frame and a load-supporting carriage slidably mounted on said upright frame, said means comprising arms projecting forwardly from said carriage and having depending portions affixed to said carriage to move therewith, a generally square steel plate carried by and depending from said arms, a flexible continuous sealing member bonded to the underside of said plate following the generally square outline of the plate and disposed adjacent the four edges thereof whereby to provide a suction area of substantial size between said plate and the package, and a protective wire screen attached to the under face of the steel plate within the area defined by the sealing member.

3. Package engaging and lifting means for mounting upon an industrial truck in which the truck includes an internal combustion engine, an upright frame and a load-supporting carriage slidably mounted on said upright frame, said means comprising arms projecting forwardly from said carriage and having depending portions affixed to said carriage to move therewith, a steel plate carried by and depending from said arms, a flexible continuous sealing member bonded to the underside of said plate following generally the outline of the plate and disposed adjacent the periphery thereof whereby to provide a suction area of substantial size between said plate and the package, a flexible conduit interconnecting the steel plate and the intake manifold of the internal combustion engine, and a protective wire screen attached to the under face of the steel plate within the area defined by the sealing member.

*4. In combination, an industrial lift truck having an internal combustion engine to drive the truck from place-to-place, said engine having an intake manifold, a mast on said truck, a load engaging and supporting carriage movable vertically along said mast, means for raising said carriage, suction head means on said carriage for engaging a load to be lifted, conduit means connecting said suction head means to the intake manifold of said engine to create a subatmospheric pressure at said suction head means to enable said load to be lifted, said conduit means providing for continued communication between said suction head means and said intake manifold in all vertical positions of said carriage relative to said truck, and valve means for controlling the communication of said intake manifold with said suction head means.*

*5. In combination, an industrial lift truck having an internal combustion engine to drive the truck from place-to-place, a mast on said truck, a load engaging and supporting carriage movable vertically along said mast, a suction head on said carriage having a flat face for disposition next to a load to be lifted, said head having a flexible peripheral continuous sealing member for*

*engagement with a load, and a conduit connecting said head to the intake manifold of said engine to create a subatmospheric pressure at said head to enable said load to be lifted, and air pump means on the truck body constituting an auxiliary source of vacuum for said head, means whereby said air pump means is activated when the vacuum at said head drops below a predetermined value.*

*6. In combination, an industrial lift truck having an internal combustion engine to drive the truck from place to place, said engine having an intake manifold, a mast on said truck, a carriage movable vertically along said mast, means for raising said carriage, suction head means on said carriage for engaging a load to be lifted, vacuum pump means constituting an auxiliary source of vacuum for said head means and located on the body of said truck, a common conduit extending from said head means toward said intake manifold and said vacuum pump means, and means for connecting said intake manifold and said vacuum pump means to said conduit so that said conduit constitutes a common conduit for said intake manifold and said vacuum pump means and valve means for closing off communication between said intake manifold and said conduit.*

*7. In an industrial lift truck having a body with an internal combustion engine to drive the truck from place to place,*

*said engine having an intake manifold which is at subatmospheric pressure while said engine is in operation,*

*a mast on said body,*

*a load carriage movable along said mast,*

*suction head means on said carriage for engaging a load to be lifted,*

*conduit means connected between said intake manifold and said suction head means for creating a subatmospheric pressure at said suction head means,*

*and valve means in said conduit means responsive to the occurrence of higher pressure on the manifold side thereof than on the suction head means side thereof to close off communication between said intake manifold and said suction head means.*

*8. In an industrial lift truck having a body with an internal combustion engine to drive the truck from place to place,*

*said engine having an intake manifold which is at subatmospheric pressure while said engine is in operation,*

*a mast on said body,*

*a load carriage movable along said mast,*

*suction head means on said carriage for engaging a load to be lifted,*

*vacuum pump means on said body,*

*conduit means connecting said vacuum pump means and said intake manifold and placing the same simultaneously in communication with said suction head means,*

*means for closing off communication between said intake manifold and said suction head means,*

*and means for assuring the continued operation of said vacuum pump means after such closing off operation.*

*9. In an industrial lift truck having a body with an internal combustion engine to drive the truck from place to place,*

*said engine having an intake manifold which is at subatmospheric pressure while said engine is in operation,*

*a mast on said body,*

*a load carriage movable along said mast,*

*suction head means on said carriage for engaging a load to be lifted,*

*vacuum pump means stationarily mounted on said body,*

*means placing said vacuum pump means and said intake manifold in communication with one another at said body,*

*a single conduit connected to said placing means and extending therefrom to said carriage and having sufficient length to permit vertical movement of said carriage without interference by said single conduit,*

*check valve means in said placing means and responsive to a differential pressure that is higher on the intake manifold side thereof than on the suction head side thereof for closing off communication between said intake manifold and said suction head means and between said intake manifold and said vacuum pump means without closing off communication of said vacuum pump means with said suction head means.*

References Cited in the file of this patent or the original patent

UNITED STATES PATENTS

| | | |
|---|---|---|
| 2,169,739 | Owen | Aug. 15, 1939 |
| 2,178,370 | Dunham | Oct. 31, 1939 |
| 2,347,491 | Lente | Apr. 25, 1944 |
| 2,615,299 | Holmes | Oct. 28, 1952 |
| 2,622,750 | Ehlers | Dec. 23, 1952 |
| 2,687,226 | Garrett | Aug. 24, 1954 |
| 2,708,046 | Cushman | May 10, 1955 |
| 2,709,519 | Cushman | May 31, 1955 |
| 2,716,497 | Wahl et al. | Aug. 30, 1955 |
| 2,732,957 | Horner | Jan. 31, 1956 |
| 2,815,240 | Lytle | Dec. 3, 1957 |
| 2,887,849 | Lytle | May 26, 1959 |
| 2,893,581 | Cushman | July 7, 1959 |
| 2,899,088 | Corbin | Aug. 11, 1959 |
| 2,920,916 | Pagdin | Jan. 12, 1960 |
| 2,937,490 | Calvert | May 24, 1960 |
| 3,040,920 | Harris | June 26, 1962 |